Sept. 27, 1955  A. SOSS  2,718,697
CLEAVER
Filed April 20, 1953  2 Sheets-Sheet 1
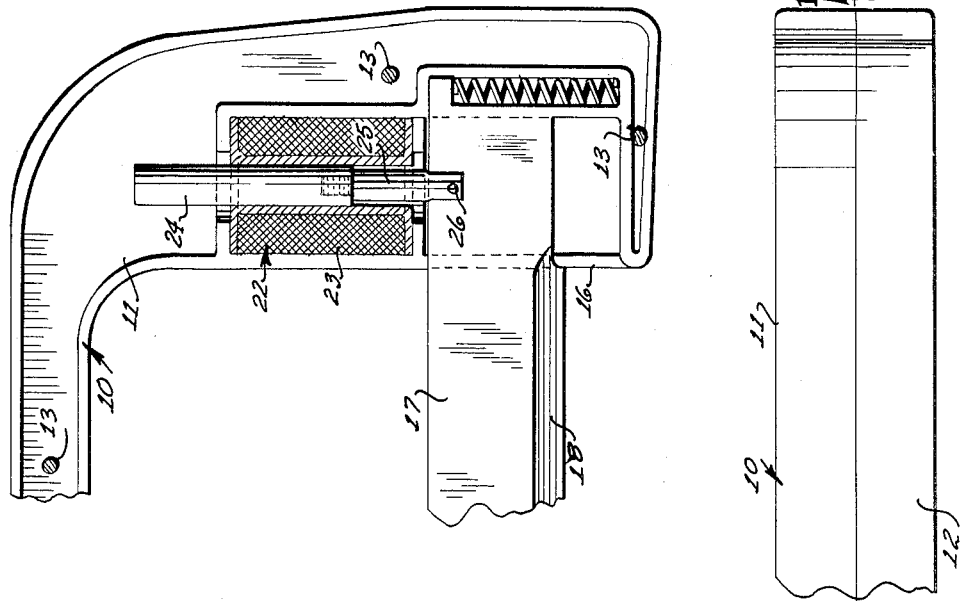
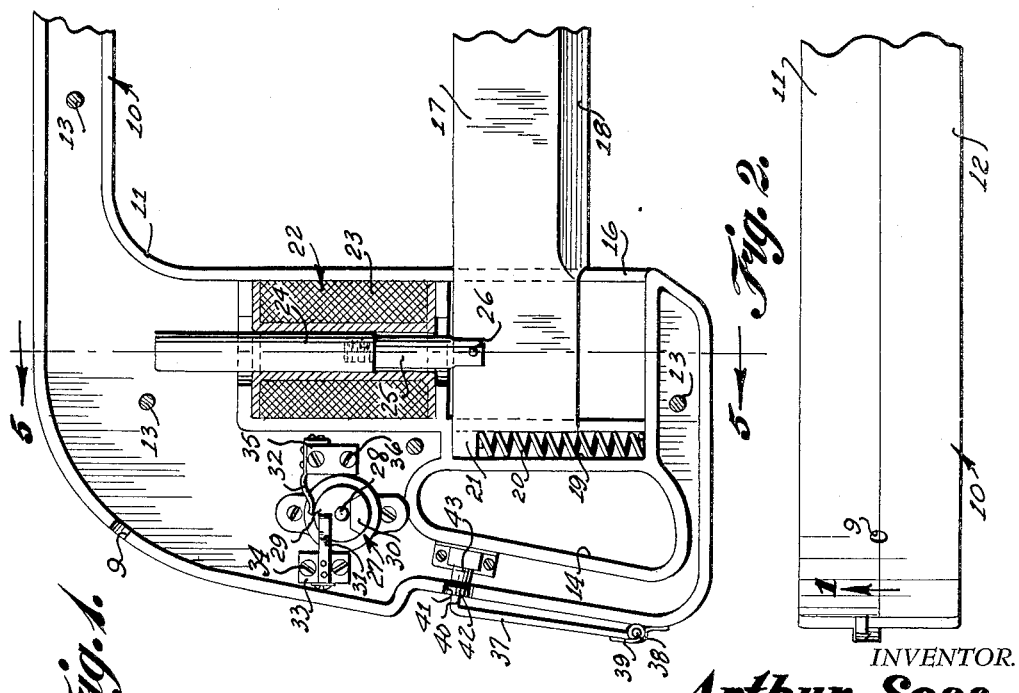
INVENTOR.
Arthur Soss.
BY Victor J. Evans & Co.
ATTORNEYS

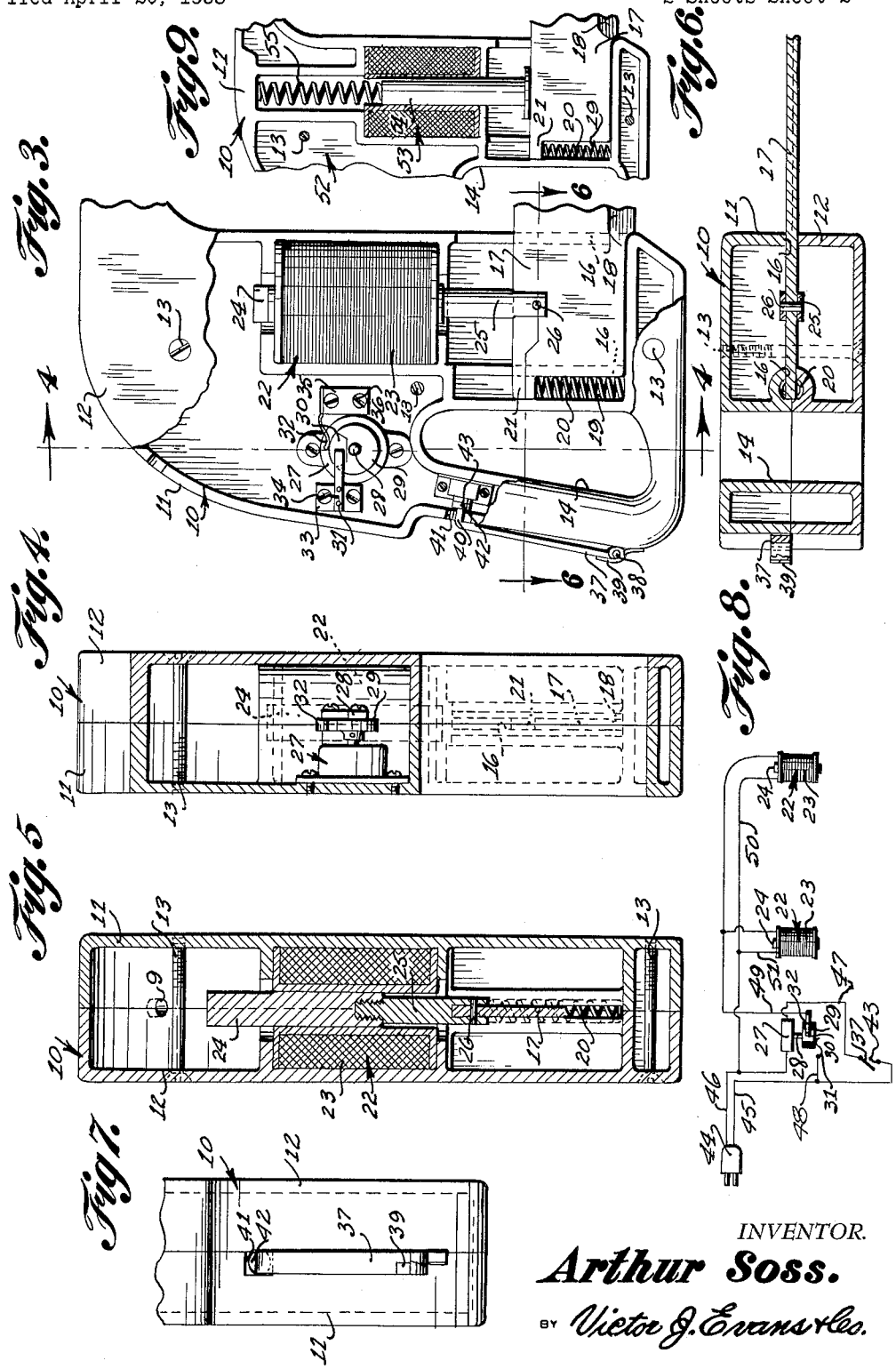

United States Patent Office 2,718,697
Patented Sept. 27, 1955

2,718,697

CLEAVER

Arthur Soss, McCook, Nebr.

Application April 20, 1953, Serial No. 349,842

1 Claim. (Cl. 30—272)

This invention relates to a cleaver, and more particularly to an electrically operated cutting cleaver.

The object of the invention is to provide an electrically operated cleaver which will facilitate the cutting or splitting of meat or bones such as in the cutting of beef or pork.

Another object of the invention is to provide an electrically operated cleaver which is especially suitable for use by butchers or other persons, the cleaver of the present invention including a blade provided with a cutting edge that is actuated by a plurality of solenoids, there being a manually operable switch for controlling actuation of the solenoids and blade.

A further object of the invention is to provide a cleaver which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the cleaver of the present invention, with parts broken away and in section.

Figure 2 is a fragmentary top plan view of the cleaver.

Figure 3 is a fragmentary side elevational view, with parts broken away and in section, and showing the blade in its down position.

Figure 4 is a sectional view taken on the line 4—4 of Figure 3.

Figure 5 is a sectional view taken on the line 5—5 Figure 1.

Figure 6 is a sectional view taken on the line 6—6 of Figure 3.

Figure 7 is an end elevational view showing the manually operable switch.

Figure 8 is a schematic showing of the wiring circuit for the cleaver.

Figure 9 is a fragmentary sectional view showing a modified form of the invention.

Referring in detail to Figures 1-8 of the drawings, the numeral 10 designates a frame which may be fabricated of any suitable material such as metal, and the frame 10 includes a pair of sections 11 and 12 which may be connected together by suitable screws or bolts 13, Figure 4 and 5. An opening 14 is arranged in the frame 10, and the opening 14 defines a handle or hand grip 15 so as to facilitate the holding or carrying of the cleaver of the present invention.

There is further provided in the frame 10 a pair of guide slots 16 which define or provide a guide for a movable cutting or splitting blade 17, the blade 17 being provided with a beveled cutting edge 18, Figure 1. Chambers 19 are arranged contiguous to each end of the blade 17 within the frame 10, and a coil spring 20 is positioned in each of the chambers 19. One end of each of the coil springs 20 abuts a lug 21 that extends from the ends of the blade 17, the coil springs 20 serving to normally bias or urge the blade 17 into the position shown in Figure 1.

A means is provided for urging the blade 17 from the position shown in Figure 1 to the position shown in Figure 3 in a manner to cause the cutting edge 18 to split or cut the beef or pork in the desired locations. This means comprises a pair of solenoids 22 which each include a coil 23. A core 24 is movably mounted in each coil 23, and a shank 25 is connected to each of the cores 24. One end of the shanks 25 is bifurcated and this bifurcated end straddles a portion of the blade 17. A suitable pin 26 serves to connect the shanks 25 to the blade 17, Figure 1.

Mounted within the frame 10 is a small electric motor 27 which may be connected to a suitable source of electrical energy by a cord or cable extending through an opening 9 in the frame 10. The motor 27 drives a shaft 28 which has mounted thereon a bushing 29 of insulated material. Carried by the bushing 29 is a metal contact 30, and the contact 30 is mounted for movement into and out of engagement with a pair of terminals or contacts 31 and 32. The terminal 31 is connected to an insulated member 33 which may be secured to the frame 10 by suitable screws 34. The other terminal 32 is connected to an insulated body 35, and the insulated body 35 may be secured to the frame 10 by screws 36.

There is further provided a manually operable switch for controlling the actuation of the solenoids and motor, and this switch includes a manually operable lever 37 that is pivotally connected to the frame 10 by a pin 38, there being a spring member 39 connected to the lever 37. The lever 37 includes a transverse portion 40 which is adapted to move through a cut-out or opening 41 in the frame 10, and a button 42 is mounted on the inner end of the transverse portion 40. The button 42 is mounted for movement into and out of engagement with a button 43.

Referring to Figure 8 of the drawings there is shown the wiring diagram for the cleaver and the numeral 44 designates a plug which may be connected to a suitable outlet so that the cleaver can be connected to a suitable source of electrical energy. A pair of wires 45 and 46 lead from the plug 44, and the wire 45 may lead to the stationary button 43 which is adapted to be engaged by the button 42 on the lever 37 when the circuit is to be closed. A wire 47 leads from the lever 37 to the motor 27, and a wire 48 connects the line 45 to the contact 31. A line 49 connects the other contact 32 to the solenoids 22, and lines 50 and 51 connect the solenoids 22 to the supply line 46.

Referring to Figure 9 there is shown a modified form of the invention wherein the frame is indicated by the numeral 52. The blade 17 is again movably mounted in the frame, and the coil springs 20 engage lugs 21 on the blade 17. However, in this form of the invention a pair of additional coil springs 55 are provided, and the coil springs 55 serve to urge the blade 17 into the position shown in Figure 9 against the tension of the coil springs 20. One of the coil springs 55 is provided for each of the solenoids 53, and the coil springs 55 engage cores 54 which abut the blade 17, there being one of the cores 54 movably mounted in each of the solenoids 53.

From the foregoing it is apparent that an electrically operated cleaver has been provided which will facilitate the cutting of meat and the like. In use the cleaver may be gripped by the handle portion 15 and the plug 44 may be connected to a suitable source of electrical energy. Then by manually depressing the lever 37 the circuit will be completed so that the solenoids 22 will selectively or alternately move the blade 17 from the position shown in Figure 1 to the position shown in Figure 3. It will be noted that the motor 27 constantly rotates to cause the contact 30 to selectively engage the contacts 31 and 32 so that the electrical circuit will be alternately broken and completed whereby when the current is turned off leading to the solenoids 22, the springs 20 will return the cutting blade 17 from the position shown in Figure 3 to the position shown in Figure 1. Thus there will be effected a constant and rapid reciprocation of the cutting blade 17 so that the meat can be effectively cut or severed or split. The screws or bolts 13 serve to hold the sections 11 and 12 connected together.

As previously stated the frame 10 carries the movable splitting blade 17 and the blade 17 moves through the slots 16 in the frame. The blade 17 is mounted on the pair of springs 20 which are of sufficient pressure or tension to lift the blade to its raised position when the cores 24 of the electromagnets or solenoids are lifted to their top position by means of the electric current flowing through the windings 23. As the flow or current is interrupted or stopped by means of the contact block 30 rotating beneath the terminal 32, the cores 24 are released from the magnetic pull and are driven downwardly if the additional coil springs are used such as the coil springs 55 in Figure 9. Thus, in the modified form of the invention shown in Figure 9 the coil springs 55 drive the blade 17 down with force to complete the cutting stroke. The current interrupter includes the small insulated wheel 29 which is mounted on the motor shaft 28 and there is the block of metal 30 for opening and closing the circuit upon each revolution of the motor. The manual control lever 37 serves to open and close the line current.

The impactor 54 shown in Figure 9 serves to cooperate with the coil spring 55 when the current in the coil 53 is off so that the blade 17 will be driven downwardly. Similarly, the spring 20 coacts with the solenoid 53 when the current is on to move the blade 17 to its raised position.

I claim:
An electrically operated cleaver, comprising a frame embodying a pair of sections secured together, there being an opening in said frame defining a handle, there being a pair of guide slots in said frame, a movable cutting blade having end portions projecting into said slots and provided with a beveled cutting edge, chambers arranged contiguous to each end of said blade within the frame, a coil spring positioned in each of said chambers for urging said blade inwardly of said frame, lugs extending from the ends of said blade and engaging said coil springs, a pair of spaced apart solenoids mounted within said frame and arranged adjacent the ends thereof, each of said solenoids having a core movably mounted therein, a shank connected to each of said cores and including a bifurcated end portion straddling an end portion of the blade, a pin connecting each shank to an end of said blade, an electric motor mounted within said frame and adapted to be connected to a source of electrical energy, a shaft extending from said motor and having an insulating bushing mounted thereon, a contact carried by said bushing, a pair of terminals adapted to be engaged by said contact and one of said terminals being electrically connected to said solenoids, a manually operable switch including a lever pivotally connected to said frame, a spring member connected to said lever for urging said lever away from said frame, said lever including a transverse portion having a first button mounted thereon, a second button connected to said frame and adapted to be engaged by said first button, and a wire electrically connecting said lever to said motor.

References Cited in the file of this patent
UNITED STATES PATENTS

| | | |
|---|---|---|
| 998,564 | Bonsall | July 18, 1911 |
| 1,060,169 | Moulin | Apr. 29, 1913 |
| 1,197,788 | Bircher | Sept. 12, 1916 |
| 2,027,396 | Meyer | Jan. 14, 1936 |
| 2,027,397 | Meyer | Jan. 14, 1936 |
| 2,320,784 | Livingston et al. | June 1, 1943 |